United States Patent
Harada et al.

(10) Patent No.: US 6,957,155 B2
(45) Date of Patent: Oct. 18, 2005

(54) METHOD AND APPARATUS FOR INSPECTING LEAKAGE OF CONTAINER

(75) Inventors: Tetsurou Harada, Shinagawa-ku (JP);
Hiroshi Nomura, Inashiki-gun (JP)

(73) Assignee: Ishikawajima Inspection & Instrumentation Co., Ltd., Tokyo (JP)

( * ) Notice: Subject to any disclaimer, the term of this patent is extended or adjusted under 35 U.S.C. 154(b) by 0 days.

(21) Appl. No.: 10/730,889

(22) Filed: Dec. 10, 2003

(65) Prior Publication Data

US 2005/0143939 A1 Jun. 30, 2005

(51) Int. Cl.$^7$ .......................... G01F 23/14; G01M 3/26; G06F 15/46
(52) U.S. Cl. ................. 702/51; 73/23.2; 73/40; 422/186.19
(58) Field of Search ................. 702/50, 51, 55; 73/40, 170.29, 23.2; 205/466, 626; 422/186.19; 426/320

(56) References Cited

U.S. PATENT DOCUMENTS

| | | | | |
|---|---|---|---|---|
| 5,069,880 A | * | 12/1991 | Karlson | 422/186.19 |
| 5,604,298 A | * | 2/1997 | Dosoretz et al. | 73/23.2 |
| 5,929,324 A | * | 7/1999 | Hu et al. | 73/40 |

* cited by examiner

*Primary Examiner*—Bryan Bui
*Assistant Examiner*—John Le
(74) *Attorney, Agent, or Firm*—Griffin & Szipl, P.C.

(57) ABSTRACT

A method for inspecting leakage of a container includes a differential pressure generation step of generating a differential pressure between the inside and the outside of a container; an ozone gas addition step of adding ozone gas to a higher pressure side of the inside and the outside; an ozone concentration detection step of measuring an ozone concentration of a lower pressure side of the inside and the outside; and a leakage determination step of determining presence of the leakage of the container based on a change in the ozone concentration.

8 Claims, 6 Drawing Sheets

METHOD AND APPARATUS FOR INSPECTING LEAKAGE OF CONTAINER

BACKGROUND OF THE INVENTION

1. Field of the Invention

The present invention relates to a method and an apparatus for inspecting leakage of a container which utilizes gas to detect the leakage.

2. Description of the Related Art

Leakage inspection is necessary in a manufacturing process or a recycling (recovering) process of containers such as drum cans and fuel tanks. For example, for the drum can for storing liquid without the leakage, apertures of 50 $\mu$m or more must be detected. In this case, even if there are apertures lower than 50 $\mu$m, it can be assumed that any leakage does not practically occur from the container.

As a leakage inspection method of the container, there have conventionally been known an immersion method and a soap water method. Hereinafter, the immersion method and the soap water method will be described.

First, the immersion method will be described. (1) At the beginning, gas (e.g., air) is injected into a container in a sealing state to pressurize the container. (2) Then, the pressurized container is immersed in liquid (e.g., water). (3) If there is an aperture in the container, the gas (e.g., air) leaks through the aperture from the inside to generate bubbles on a surface of the container in which the aperture is present. (4) The bubbles are visually searched. If the bubbles are identified, it is determined that the container has an aperture to cause leakage.

Next, the soap water method will be described. (1) First, a container is hermetically sealed, and gas (e.g., air) is injected inside to pressurize the container. (2) Then, soap water is coated on a surface of the container. (3) If there is an aperture in the container, the gas (e.g., air) leaks through the aperture from the inside to generate soap bubbles on the surface of the container in which the aperture is present. (4) The soap bubbles are visually searched. If the soap bubbles are identified, it is determined that the container has an aperture to cause leakage.

Conventionally, the aperture which causes the leakage of the container has been visually inspected by the aforementioned methods. It is theoretically conceivable that the immersion method and the soap water method can discover apertures larger than 50 $\mu$m. However, since both of the methods employ visual inspection by skilled workers, there has been uncertainty over reliability of detection of apertures in a range of 50 $\mu$m to 100 $\mu$m. In other words, bubbles or soap bubbles caused by leakage through the apertures of 50 $\mu$m to 100 $\mu$m are so small that they are overlooked in the visual inspection.

Additionally, in the case of inspecting the leakage of the container by the immersion method, a drying step is necessary to remove liquid from the surface after the process of the leakage inspection. In the case of the soap water method, cleaning and drying steps are necessary to remove soap water from the surface after the process of the leakage inspection.

On the other hand, in a leakage inspection technology field of a vacuum chamber, there has conventionally been known a leakage inspection method which uses helium gas. However, the leakage inspection method which uses the helium gas is improper for leakage inspection of a container such as a drum can or a fuel tank because sensitivity is too high. In other words, the helium gas has behavior that it leaks though an aperture much smaller than 50 $\mu$m, so that a detector detects the helium gas leaked through the gap of a sealed cap or the like of the container, and a presence of apertures of 50 $\mu$m to 100 $\mu$m which should be found cannot be confirmed.

As described above, in the conventional immersion and soap water methods, as they are visual inspection methods, the reliability of discovery of apertures of small sizes (e.g., 50 $\mu$m to 100 $\mu$m) is low, and the necessity of removal of water, soap or the like after the leakage inspection requires time and cost in the post process. Additionally, in the leakage inspection method which uses the helium gas, presence of an aperture of a target size cannot be identified because the sensitivity is too high.

Therefore, there has been a strong desire for a highly reliable method and a highly reliable apparatus for inspecting leakage through a narrow aperture in place of the conventional immersion and soap water methods. Moreover, there has been a strong desire for a leakage detection method and a leakage inspection apparatus of a container which need no post process.

SUMMARY OF THE INVENTION

The present invention has been made with the foregoing problems in mind. That is, objects of the invention are to provide a highly reliable method and a highly reliable apparatus for inspecting leakage of a container through an aperture of a size which is difficult to be visually identified in place of the conventional immersion and soap water methods.

In order to achieve the above objects, the present invention has been developed.

A first aspect of the present invention is directed to a method for inspecting leakage of a container, comprising a differential pressure generation step of generating a differential pressure between the inside and the outside of a container; an ozone gas addition step of adding ozone gas to a higher pressure side of the inside and the outside; an ozone concentration detection step of measuring an ozone concentration of a lower pressure side of the inside and the outside; and a leakage determination step of determining presence of the leakage of the container based on a change in the ozone concentration.

According to the above constitution of the invention, the differential pressure is generated between the inside and the outside of the container in the differential pressure generation step, the ozone gas is added to the higher pressure side of the inside and the outside in the ozone gas addition step, the ozone concentration of the lower pressure side of the inside and the outside is measured in the ozone concentration detection step, and the presence of the leakage of the container is determined based on the change in the ozone concentration in the leakage determination step. Thus, small leakage can be detected highly sensitively by using highly active ozone, highly reliable leakage determination can be carried out within a short time, and the leakage determination can be carried out in a dry environment to facilitate a post process.

A second aspect of the present invention is directed to the above method, wherein the differential pressure generation step has a container storage step of storing the container in a storage container, and a container pressurization/pressure reduction step of operating one of pressurization and pressure reduction for one of the container and the storage container.

According to the constitution, the container is stored in the storage container in the container storage step, and one of pressurization and pressure reduction is carried out for one of the container and the storage container in the container pressurization/pressure reduction step. Thus, leakage determination can be carried out at once for the entire container while the storage container is located outside the container, and one of the pressurization and the pressure reduction is carried out to forcibly generate the differential pressure between the inside and the outside. As a result, the leakage determination can be carried out within a short time.

A third aspect of the present invention is directed to the above method, wherein the ozone gas addition step has an ozone gas generation step of generating ozone gas from the atmosphere, and an ozone gas feeding step of feeding the ozone gas to the higher pressure side of the inside and the outside.

According to this constitution, the ozone gas is generated from the atmosphere in the ozone gas generation step, and the ozone gas is fed to the higher pressure side of the inside and the outside in the ozone gas feeding step. Thus, since no special gas needs to be prepared, and the ozone is naturally decomposed to return to air, no burdensome post process is necessary.

A fourth aspect of the present invention is directed to the above method, wherein the ozone concentration detection step has an ozone concentration measuring step of measuring an ozone concentration in a lower part of the inside or the outside by an ozone sensor, and an ozone concentration signal output step of outputting a signal corresponding to the measured ozone concentration.

According to this constitution, the ozone concentration in the lower part of the inside or the outside is measured by the ozone sensor in the ozone concentration measuring step, and the signal corresponding to the measured ozone concentration is outputted in the ozone concentration signal output step. Thus, since the ozone larger in specific gravity than air settles down, and the ozone sensor located on the bottom part measures the ozone concentration of the ozone gas, the leakage determination can be quickly carried out.

A fifth aspect of the present invention is directed to the above method, wherein the leakage determination step has an ozone concentration comparison step of calculating a concentration difference between the ozone concentration and a predetermined ozone concentration, and an ozone concentration determination step of determining presence of leakage when the concentration difference is larger than a predetermined value.

According to this constitution, the concentration difference between the ozone concentration and the predetermined ozone concentration is calculated in the ozone concentration comparison step, and the presence of leakage is determined when the concentration difference is larger than the predetermined value in the ozone concentration determination step. Therefore, the ozone gas leakage can be easily determined only by seeing a change in the ozone concentration.

A sixth aspect of the present invention is directed to the above method, wherein the container is used as a container in which liquid is sealed.

According to this constitution, the container is used as a container in which liquid is sealed, and the lower limit value of the aperture size through which the ozone gas leaks is approximate to that of the aperture size through which practically no liquid leaks. Therefore, the leakage determination can be effectively carried out for the container in which the liquid is sealed.

A seventh aspect of the present invention is directed to an apparatus for inspecting leakage of a container, comprising a storage container for storing a container therein in a sealed state; a pressurization/pressure reduction device which communicates with one of the container and the storage container to operate one of pressurization and pressure reduction; an ozone gas feeder for feeding ozone gas to a higher internal pressure side of the container and the storage container; and an ozone concentration detector for measuring an ozone concentration on a lower internal pressure side of the container and the storage container, wherein presence of leakage in the container is determined when the ozone concentration exceeds a predetermined value.

According to the above constitution of the invention, the storage container stores the container therein in the sealed state, the pressurization/pressure reduction device which operates one of pressurization and pressure reduction communicates with one of the container and the storage container, the ozone gas feeder feeds the ozone gas to the higher internal pressure side of the container and the storage container, and the ozone concentration detector measures the ozone concentration on the lower internal pressure side of the container and the storage container. Thus, small leakage can be detected highly sensitively by using highly active ozone, highly reliable leakage determination can be carried out within a short time, and the leakage determination can be carried out in a dry environment to facilitate a post process.

Other objects and advantageous features of the present invention will become apparent upon reading of the following description made with reference to the accompanying drawings.

DESCRIPTION OF THE PREFERRED EMBODIMENTS

Figure 1:
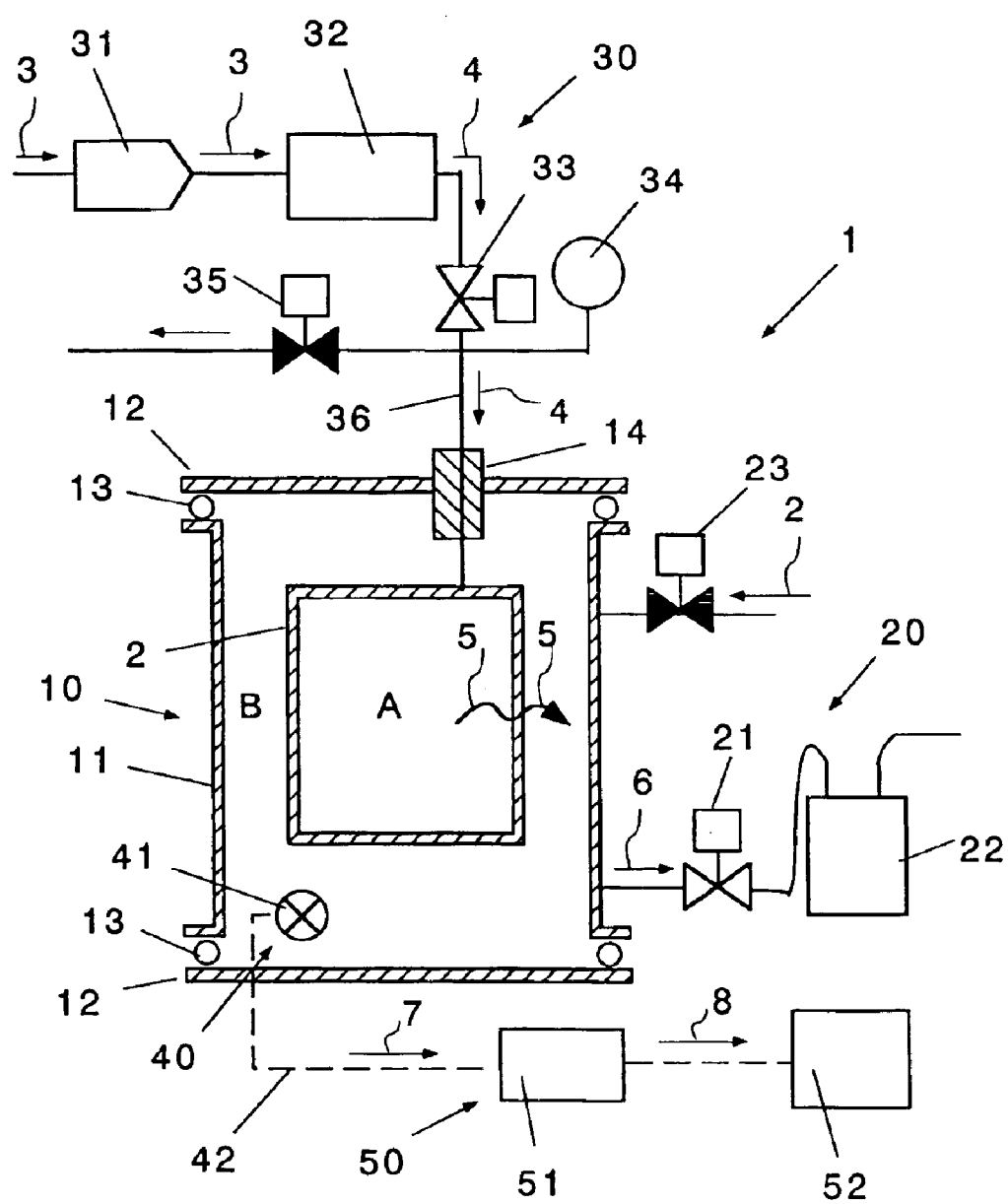
FIG. 1 is a conceptional diagram of an apparatus according to an embodiment of the present invention.

Next, the preferred embodiments of the present invention will be described with reference to the accompanying drawings. In the drawings, common portions are denoted by similar reference numerals, and overlapped description will be omitted.

First, description will be made of a container leakage inspection apparatus according to an embodiment of the present invention. FIG. 1 is a conceptional diagram of an apparatus for implementing the embodiment of the invention.

At the beginning, there will be described an example of the container leakage inspection apparatus for implementing a container leakage inspection method of the invention.

A container leakage inspection apparatus 1 inspects leakage of a container 2, and comprises a storage container 10, a pressurization/pressure reduction device 20, an ozone gas feeder 30, an ozone concentration detector 40 and a leakage determination device 50. The container 2 stores substances (e.g., liquid fuel) inside. If there is a very small aperture on a wall constituting the container 2, the substance leaks through the aperture and, for example, it is a drum can. The container leakage inspection apparatus 1 determines whether there is leakage or not caused by the aperture.

The storage container 10 stores the container 2 inside in a sealed state, and it has a storage container main body 11, a storage container cap 12 and a storage container cap sealing member 13.

The storage container main body 11 is a metal cylinder of a roughly cylindrical shape, and it has flanges which respectively have sealing surfaces in both ends of the cylinder.

The storage container caps 12 are roughly circular plates which respectively cover both ends of the storage container main body 11, and each of them has a sealing surface on an outer peripheral part of one side. A cap penetration section 14 is disposed in one place of the storage container cap 12. The cap penetration section 14 inserts a pipe through from the outside of the storage container cap 12 to the inside while maintaining airtightness of the storage container cap 12.

The storage container cap sealing member 13 seals the sealing surface between the storage container main body 11 and the storage container cap 12 and, for example, it is a ring-like rubber seal.

The pressurization/pressure reduction device 20 communicates with one of the container 2 and the storage container 10 to operate pressurization and pressure reduction. It has an original valve 21, a pressure reduction pump (or pressurization pump) 22, and an opening valve 23.

Hereinafter, for convenience of explanation, as shown, the pressurization/pressure reduction device 20 is assumed to communicate with the storage container 10 to execute a pressure reduction operation.

The original valve 21 is an opening/closing valve disposed in a pipe which communicates with an inlet side of a vacuum pump 22 (described later) and the storage container 10. When the original valve 21 is opened, air is sucked out from the storage container 10 by the vacuum pump 22 to reduce a pressure of the storage container 10.

The pressurization/pressure reduction pump (vacuum pump in the drawing) 22 is one of a pressurization pump and a pressure reduction pump. The pressurization pump feeds gas to a target container to pressurize the inside. For example, it is an air pump. The pressure reduction device is a pump for removing the gas from the target container to reduce a pressure inside. For example, it is a vacuum pump.

The opening valve 23 is an opening/closing valve disposed in a pipe which communicates with the storage container 10 and the atmosphere. For example, if the opening valve 23 is opened while a pressure is reduced in the storage container 10, the atmosphere flows into the storage container 10.

If the pressurization/pressure reduction pump 22 is a vacuum pump, for example, a pressure is reduced to about 0.7 K in the storage container 10, and a differential pressure between the container 2 and the storage container 10 is set to about 0.3 K.

The ozone gas feeder 30 feeds ozone gas to one, which has a higher internal pressure, of the container and the storage container, and it has an air pump 31, an ozone generator 32, an ozone gas injection valve 33, an ozone gas pressure gauge 34, an ozone gas discharge valve 35, and an ozone gas injection pipe 36.

Hereinafter, for convenience of explanation, as shown, the ozone gas feeder 30 is assumed to feed the ozone gas to the container 2.

The air pump 31 sucks the atmosphere 3 through an inlet side to boost a pressure to a predetermined level, and discharges it through an outlet side. The outlet side of the air pump 31 communicates with an inlet side of the ozone generator 32.

The ozone generator 32 generates ozone: it receives air 3 through the inlet side, generates ozone inside by, e.g., silent discharging, and discharges ozone gas 4 through an outlet side. The ozone gas is a mixture of carrier gas and ozone, and the carrier gas is air in the drawing. Normally, in the case of the ozone generator 32 of a silent discharging type, ozone gas 4 of about 2000 ppm is generated.

The ozone gas injection valve 33 injects the ozone gas 4 into the container 2, and it is disposed in a pipe (referred to as ozone gas injection pipe 36, hereinafter) which communicates with the outlet side of the ozone generator 32 and the container 2. The ozone gas injection pipe 36 is laid through the cap penetration section 14 of the storage container 10.

The ozone gas pressure gauge 34 measures a pressure of the ozone gas, and it is disposed in the ozone gas injection pipe 36.

The ozone gas discharge valve 35 is an opening/closing valve for reducing the pressure of the ozone gas, and it is disposed in a pipe branched from the ozone gas injection pipe 36 to communicate with the atmosphere.

When the ozone gas of 2000 ppm is injected into the container 2 filled with the atmosphere to be diluted about twentyfold, an ozone concentration in the container 2 becomes an order of 100 ppm.

The ozone concentration detector 40 is a measuring device for measuring an ozone concentration in one, which has a lower internal pressure, of the container and the storage container, and it has an ozone sensor 41 and an ozone sensor signal line 42.

Hereinafter, for convenience of explanation, as shown, the ozone concentration measuring device 40 is assumed to measure an ozone concentration of the storage container 10.

The ozone sensor 41 outputs an electric signal 7 (referred to as an ozone concentration signal 7, hereinafter) corresponding to the ozone concentration of the ozone gas. For example, it is a semiconductor gas sensor.

To explain an example of the ozone sensor, gas to be detected is ozone, a detection range is 0 to 250 ppb, response time is 30 sec., initial rising time is within 10 min., a used temperature is 0 to 40° C., and a power supply voltage is 8 to 14 V (DC). Detection sensitivity is extremely high compared with the semiconductor gas sensor which targets other gas for detection. This may be attributed to the fact that the ozone is highly active gas.

The ozone sensor signal line 42 transmits the ozone concentration signal 7 outputted from the ozone sensor 41 to the leakage determination device 50 (described later). The ozone sensor signal line 42 is put through the storage container 10 while its airtightness is maintained to electrically connect the ozone sensor 41 to the leakage determination device 50.

The leakage determination device 50 determines presence of leakage in the container 2 when an ozone concentration in the storage container 10 exceeds a predetermined value, and it has an ozone concentration comparator 51 and an ozone concentration determination device 52.

The ozone concentration comparator 51 is a device for comparing an ozone concentration signal 7 (reference signal 8, hereinafter) before the ozone gas 4 is injected into the container 2 with an ozone concentration signal 7 (measured signal 8, hereinafter) after the ozone gas 4 is injected into the container 2.

The ozone concentration determination device 52 is a device for determining leakage of the container 2 when a difference between the reference signal 8 and the measured signal 8 exceeds a predetermined value.

Figure 2:
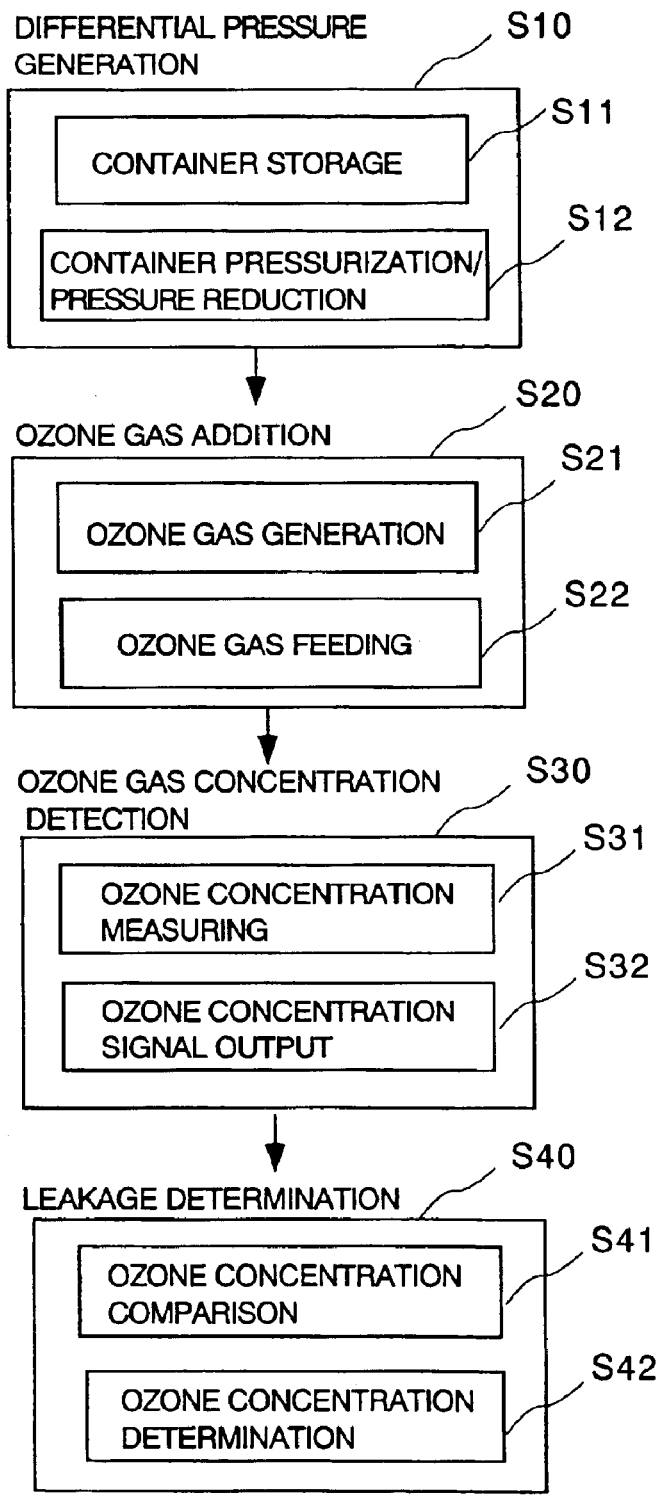
FIG. 2 is a flowchart of the embodiment of the present invention.

Next, description will be made of a container leakage inspection method according to an embodiment of the present invention. FIG. 2 is a flowchart of the embodiment of the invention.

For convenience of explanation, description will be made by taking an example of implementing the leakage inspection method which uses the foregoing leakage inspection apparatus.

Differential pressure generation step S10: a step of generating a differential pressure between the inside and the outside of the container, and it has a container storage step S11 and a storage pressurization/pressure reduction step S12.

Description will be made by taking an example of storing the container in the storage container, and reducing the pressure of the storage container to generate a differential pressure between the container and the storage container.

The container storage step S11 is a step of entering the container 2 into the storage container 10. The storage container cap 12 of the storage container 10 is removed to enter the container 2 into the storage container main body 11. The ozone gas injection pipe 36 communicates with the container 2 to put the storage container cap 12 over the storage container main body 11.

The container pressurization/pressure reduction step S12 is a step of operating one of pressurization and pressure reduction for one of the container and the storage container. The opening valve 23 and the original valve 21 are opened to actuate the vacuum pump 22. The atmosphere enters the storage container 10 through the opening valve 23, and then it is discharged from the outlet side of the vacuum pump through the original valve 21. After the inside of the storage container 10 is sufficiently replaced by the atmosphere, the opening valve 23 is closed. The vacuum pump 22 discharges air from the storage container 10 to set a pressure in the storage container to, e.g., about 0.7 k.

Ozone gas addition step S20: a step of adding ozone gas to a higher pressure side of the inside (container) and the outside (storage container), and it has an ozone gas generation step S21 and an ozone gas feeding step S22.

Description will be made by taking an example of adding the ozone gas to the container.

The ozone gas generation step S21 is a step of generating ozone gas from the atmosphere. The atmosphere 3 is sucked in through the air pump 31 to boost a pressure, and it is sent to the ozone generator 32. The ozone generator 32 causes silent discharging in air to generate ozone gas 4. For example, the ozone gas 4 is gas which contains ozone of 2000 ppm in air.

The ozone gas feeding step S22 is a step of feeding the ozone gas 4 to a higher pressure side of the inside (container) and the outside (storage container). Description will be made by taking an example of feeding the ozone gas 4 into the container. The ozone gas discharge valve 35 is closed while the ozone gas injection valve 33 is opened. The ozone gas 4 enters the container 2 through the ozone gas injection pipe 36.

For example, the ozone gas 4 is diluted about twentyfold by air in the container 2 to fill the container 2 with ozone gas 5 of about 100 ppm.

If an aperture is present on the wall of the container to cause leakage, the ozone gas 5 leaks through the aperture to enter the storage container 10.

Ozone concentration detection step S30: a step of measuring an ozone concentration in a lower pressure side of the inside (container) and the outside (storage container), and it has an ozone concentration measuring step S31 and an ozone concentration signal output step S32.

Description will be made by taking an example of measuring an ozone concentration inside (outside of the container) the storage container.

The ozone concentration measuring step S31 is a step of measuring an ozone concentration in a lower part of the storage container (outside of the container) by the ozone sensor 41. The ozone concentration is measured by the ozone sensor 41 arranged in the lower part in the storage container 10. As it is larger in specific gravity than air, the ozone gas 5 leaked through the aperture of the container 2 drifts downward to stay on the bottom part of the storage container 10.

The ozone concentration signal output step S32 is a step of outputting a signal corresponding to the measured ozone concentration. A signal outputted from the ozone sensor 41 is sent through the ozone sensor signal line to the leakage determination device 50.

Leakage determination step S40: a step of determining presence of leakage in the container based on a change in ozone concentration, and it has an ozone concentration comparison step S41 and an ozone concentration determination step S42.

The ozone concentration comparison step S41 is a step of calculating a difference between the ozone gas concentration and a predetermined ozone concentration. An ozone concentration signal 7 (reference signal 8, hereinafter) before the ozone gas 4 is injected into the container 2 is compared with an ozone concentration signal 7 (measured signal 8, hereinafter) after the ozone gas 4 is injected into the container 2.

The ozone concentration determination step S42 is a step of determining presence of leakage when the difference is larger than a predetermined value. If the difference between the reference signal 8 and the measured signal 8 exceeds the predetermined value, it is determined that leakage has occurred in the container 2.

EMBODIED EXAMPLE

Next, description will be made of a result of an effect checking test in the case of using ozone gas for leakage inspection.

Figure 3:
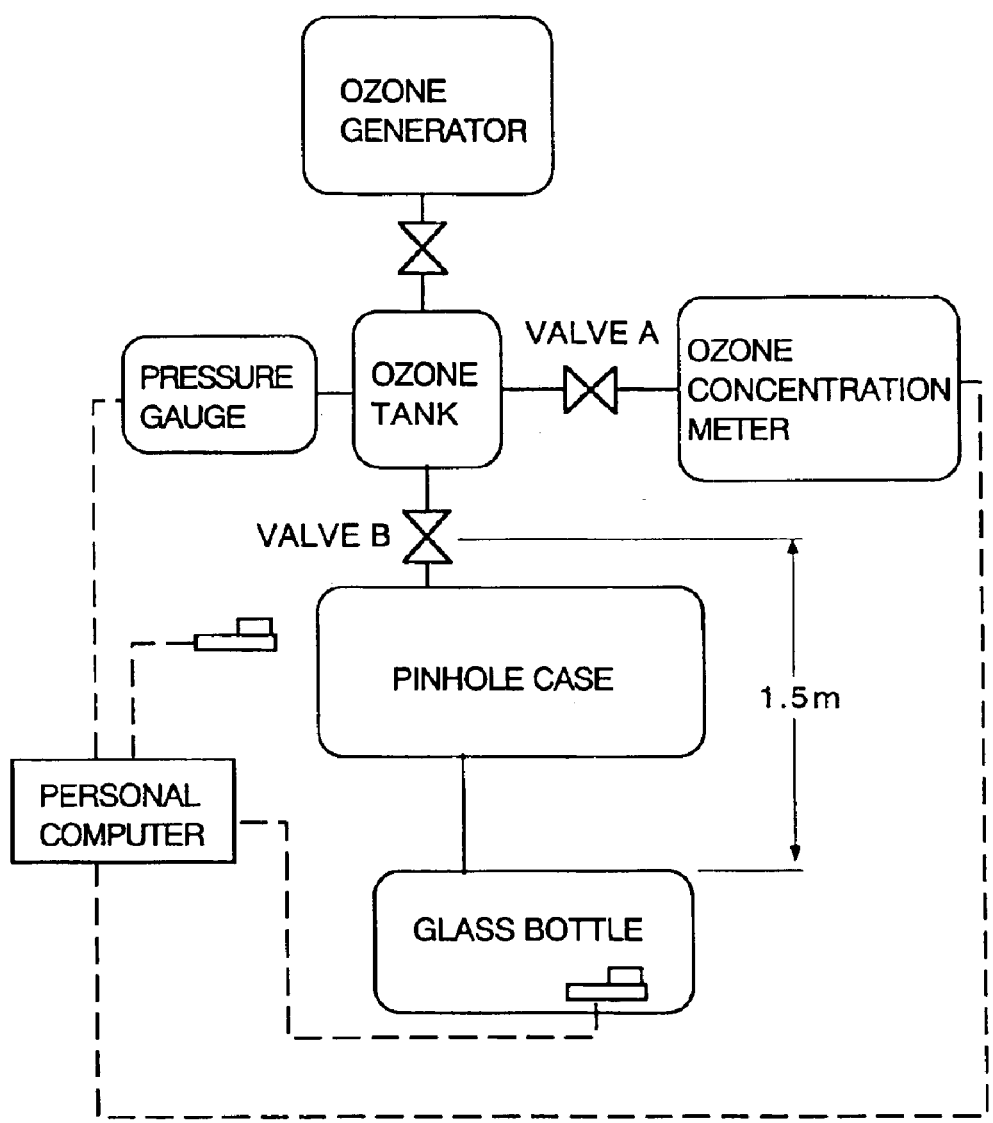
FIG. 3 is a schematic view of the apparatus according to an embodied example of the present invention.

First, a testing device will be described. FIG. 3 is a schematic view of an apparatus according to the embodiment of the present invention.

The testing device comprises an ozone generator, an ozone tank, a pinhole case, a glass bottle, two ozone sensors, a pressure gauge, and a personal computer. Ozone gas generated by the ozone generator is reserved in the ozone tank, and then a valve B located between the ozone tank and the pinhole case is opened. A hole of a predetermined size is artificially bored in the pinhole case by a laser beam. A pinhole communicates with the glass bottle, and one ozone sensor is disposed in the glass bottle. The other ozone sensor is disposed outside to measure an ozone concentration of an environment. Further, an ozone concentration meter communicates through the valve A with the ozone tank. Additionally, the pressure gauge communicates with the ozone tank.

Regarding the pinhole case, pinhole cases which have holes of 60 $\mu$m, 100 $\mu$m and 150 $\mu$m, respectively are prepared.

The personal computer records a pressure and an ozone concentration in the glass bottle, an ozone concentration of an outer peripheral part, an output of the pressure gauge, and a pressure of the ozone concentration meter.

A measuring range of the ozone sensor is 0 ppb to 250 ppb, and an output of the ozone sensor is saturated at 250 ppb.

Next, a testing method will be described.

A pinhole case of a predetermined hole is installed, and the glass bottle is filled with the atmosphere. The valve B is opened to start measurement. After an output of the ozone sensor in the glass bottle is saturated, the valve A is opened to measure a pressure and an ozone concentration of the ozone tank.

Figure 4A:
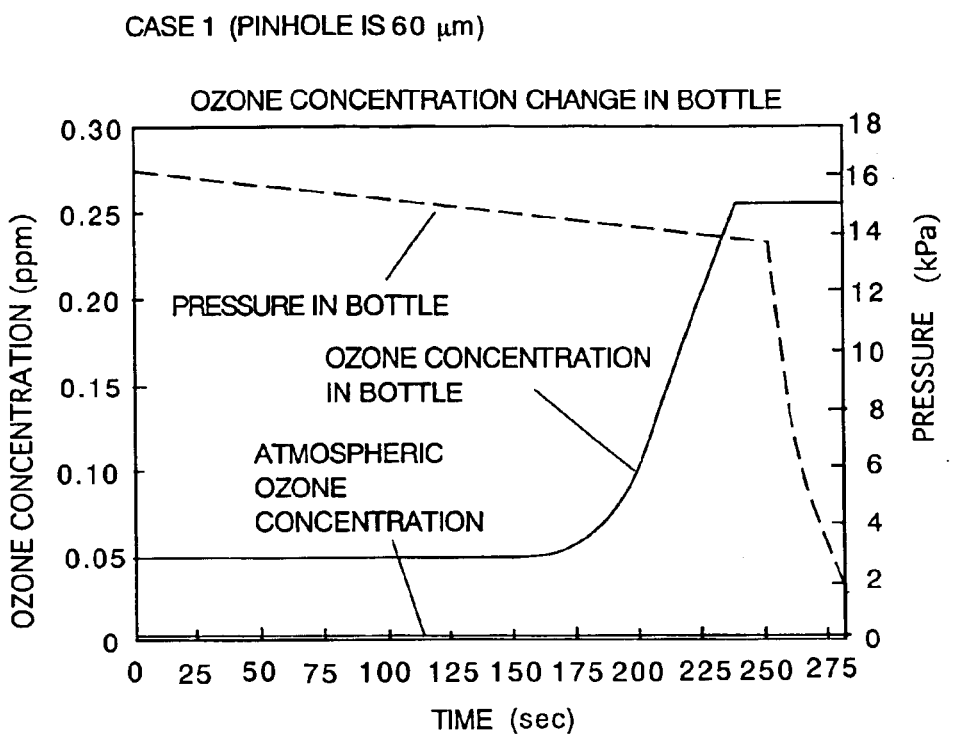
FIG. 4A is a view showing an ozone concentration change in a bottle in a first embodied example (CASE 1) of the present invention.
Figure 4B:
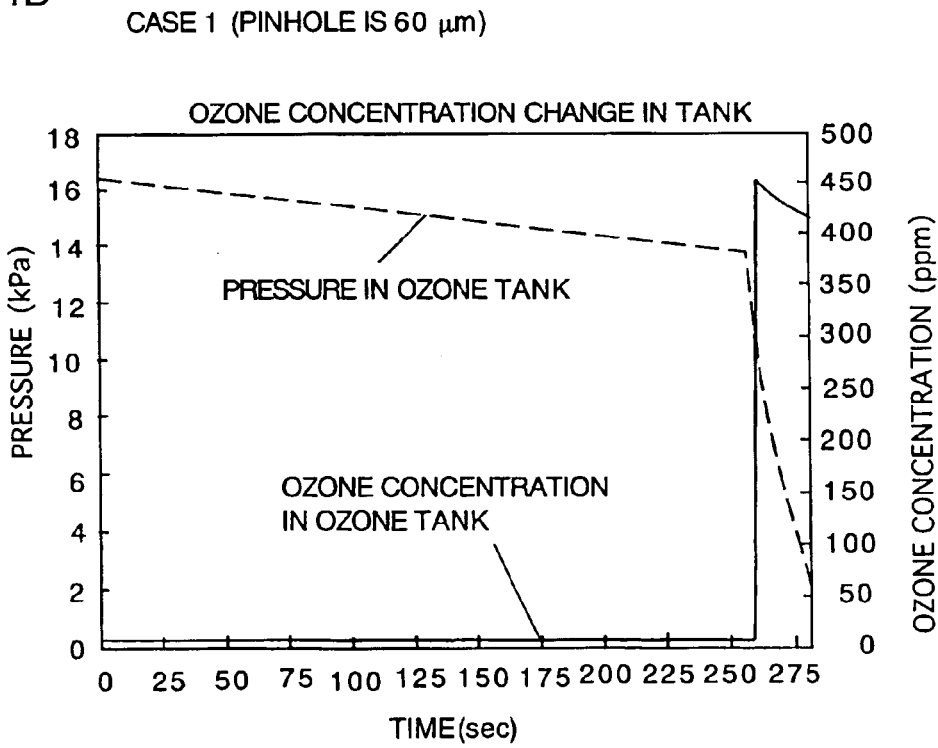
FIG. 4B is a view showing an ozone concentration change in an ozone tank in CASE 1.
Figure 5A:
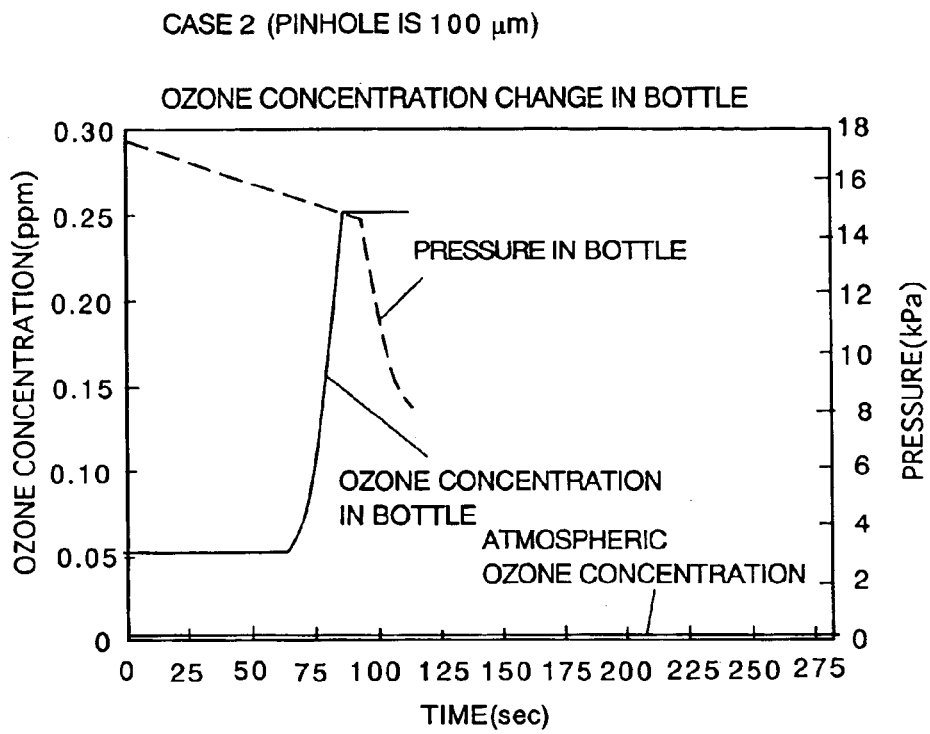
FIG. 5A is a view showing an ozone concentration change in a bottle in a second embodied example (CASE 2) of the present invention.
Figure 5B:
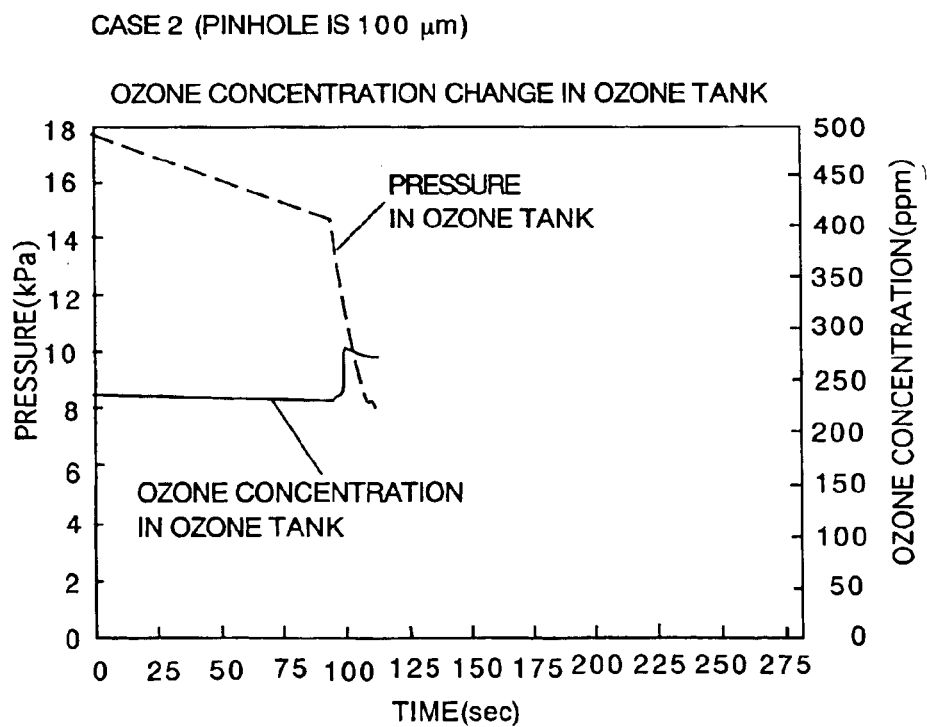
FIG. 5B is a view showing an ozone concentration change in an ozone tank in CASE 2.
Figure 6A:
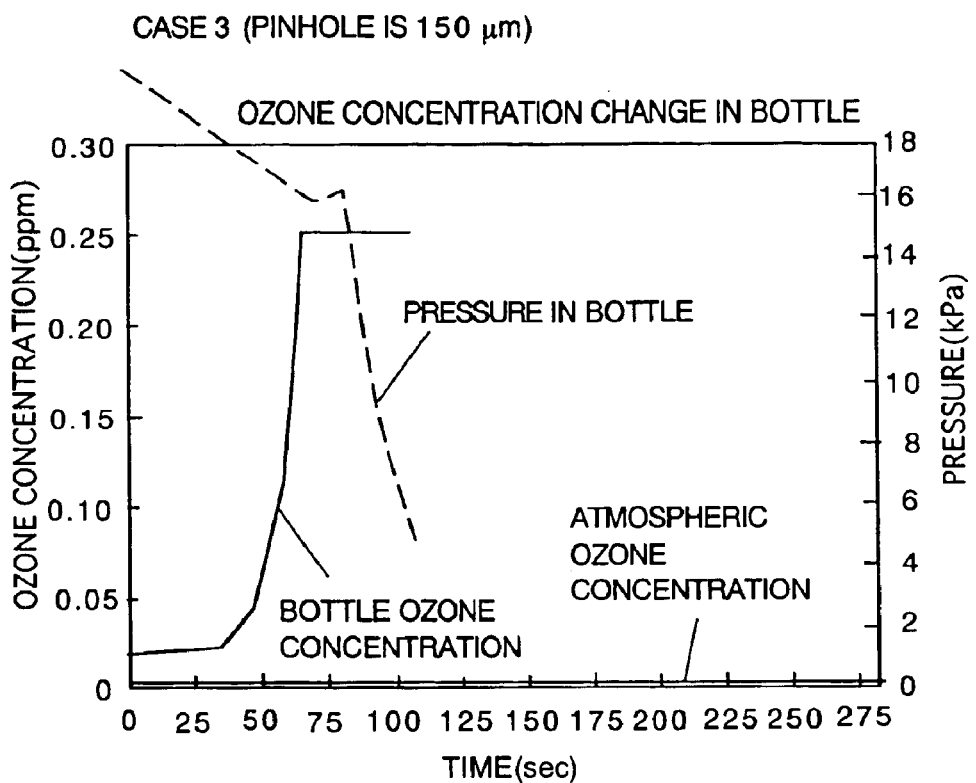
FIG. 6A is a view showing an ozone concentration change in a bottle in a third embodied example (CASE 3) of the present invention.
Figure 6B:
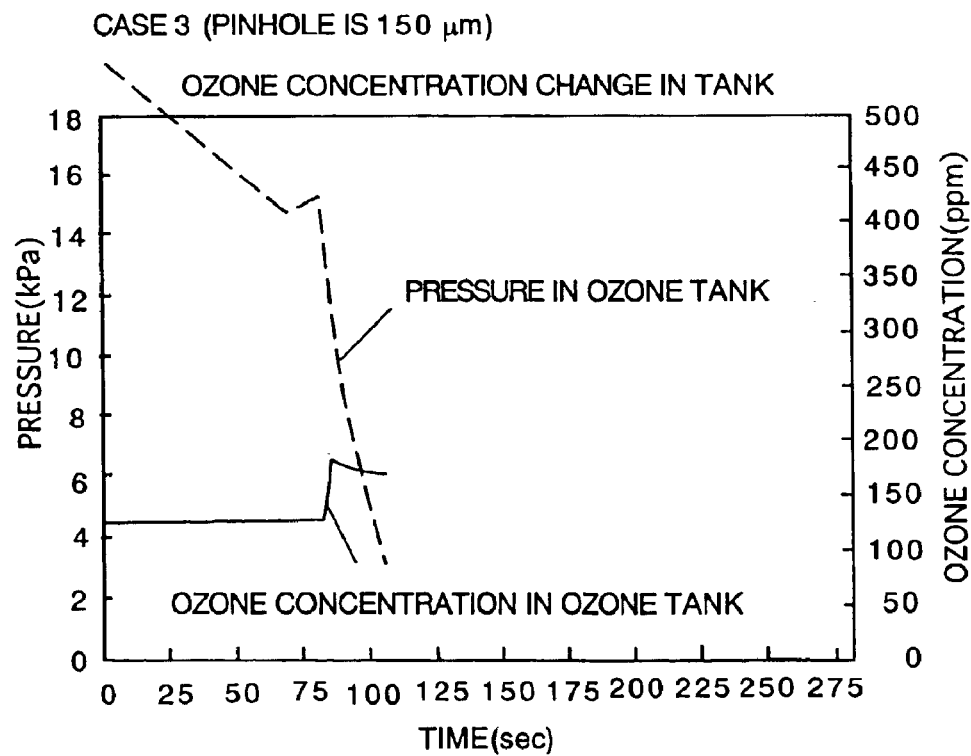
FIG. 6B is a view showing an ozone concentration change in an ozone tank in CASE 3.

Next, a result of the testing will be described. FIG. 4A is a view showing an ozone concentration change in a bottle in a first embodied example (CASE 1) of the invention, and FIG. 4B is a view showing a change in concentration in the ozone tank in CASE 1. FIG. 5A is a view showing an ozone concentration change in a bottle in a second embodied example (CASE 2) of the invention, and FIG. 5B is a view showing a change in concentration in the ozone tank in CASE 2. FIG. 6A is a view showing an ozone concentration change in a bottle in a third embodied example (CASE 3) of the invention, and FIG. 6B is a view showing a change in concentration in the ozone tank in CASE 3.

(1) CASE 1: pinhole is 60 $\mu$m

An output of the ozone sensor was saturated about 230 sec., after a start of testing. At the time, an ozone concentration in the ozone tank was about 400 ppm.

(2) CASE 2: pinhole is 100 $\mu$m

An output of the ozone sensor was saturated about 100 sec., after a start of testing. At the time, an ozone concentration in the ozone tank was about 250 ppm.

(3) CASE 3: pinhole is 150 $\mu$m

An output of the ozone sensor was saturated about 70 sec., after a start of testing. At the time, an ozone concentration in the ozone tank was about 150 ppm.

The results of the testing show that it is possible to surely detect leakage of the ozone gas in the range of 60 to 150 $\mu$m of the pinhole within a very short time.

From a correlation between the size of the pinhole and the time of ozone sensor saturation, it is apparent that it is possible to detect even leakage through an aperture of less than 60 $\mu$m.

According to the container leakage inspection method of the embodiment, it is possible to determine whether there is an aperture or not which causes container leakage highly sensitively by a simple structure within a short time.

Since the ozone gas is used, a highly sensitive and inexpensive ozone sensor can be used.

Since the ozone gas is generated from the atmosphere, it is not necessary to prepare any special gas cylinders, and thus the operation is safe but not costly.

Since the ozone gas which is naturally decomposed in air is used, a post process is simple.

Since no liquid is used unlike the conventional case, no post process steps are necessary, no time and labor are required, and thus the apparatus becomes simple.

Since the ozone sensor is disposed in the lower part of the storage container, it is possible to quickly detect the ozone gas of large specific gravity.

By using the container leakage inspection apparatus of the embodiment, it is possible to provide an apparatus capable of implementing the container leakage inspection method which has the aforementioned good features.

As described above, the container leakage inspection method of the present invention has the following effects by its constitution.

The ozone gas is added to the higher pressure side of the inside and the outside of the container, and the presence of container leakage is determined based on the change in the ozone concentration of the lower pressure side. Thus, small leakage can be highly sensitively detected by using highly active ozone, highly reliable leakage determination can be carried out within a short time, and the leakage determination can be carried out in the dry environment to facilitate the post process.

Since the container is stored in the storage container to set the aperture between the container and the storage container outside, it is possible to determine leakage at once for the entire container while the storage container is located outside the container. Since one of pressurization and pressure reduction operations forcibly generates the differential pressure between the inside and the outside of the container, the leakage determination can be carried out within a short time.

Since the ozone generated from the atmosphere is used, no special gas needs to be prepared, and the ozone is naturally decomposed to return to air. Thus, no burdensome post process is necessary.

Since the ozone sensor is installed on the bottom part, the ozone larger in specific gravity than air settles down, and the ozone sensor of the bottom part measures the ozone concentration of the ozone gas, the leakage determination can be quickly carried out.

Since the presence of leakage is determined based on the change in the ozone concentration, the leakage of the ozone gas can be easily determined only by seeing an increase in the ozone concentration.

The inspection method is employed for the container in which the liquid is sealed, and the lower limit value of the aperture size through which the ozone gas leaks is approximate to that of the aperture size through which substantially no liquid leaks. Thus, it is possible to effectively carry out leakage determination for the container in which the liquid is sealed.

As described above, the container leakage inspection apparatus of the present invention has the following effects by its constitution.

The ozone gas is injected into the container stored in the storage container, and the presence of leakage is determined based on the change in the ozone concentration in the storage container. Thus, small leakage can be highly sensitively detected by using highly active ozone, highly reliable leakage determination can be carried out within a short time, and the leakage determination can be carried out in the dry environment to facilitate the post process.

Thus, it is possible to provide a container leakage inspection method and a leakage inspection apparatus which are highly reliable and capable of surely detecting leakage through an aperture of a size difficult to be visually identified.

The present invention is not limited to the foregoing embodiments, and various changes can be made without departing from a sprit and a scope of the invention.

The pressure of the storage container is reduced to generate the differential pressure between the inside of the container and the inside of the storage container (the outside of the container). However, the invention is not limited to this. For example, the pressure of the container may be reduced to generate a differential pressure between the inside of the container and the inside of the storage container (outside of the container), the storage container may be pressurized to generate a differential pressure between the inside of the container and the inside of the storage container (outside of the container), or the container may be pressurized to generate a differential pressure between the inside of the container and the inside of the storage container (outside of the container). If the wall of the container is made of a material which easily brings about surface buckling, a pressure in the container is preferably set higher than a pressure of the outside.

The storage container is shown in the drawings to be a metal container, but the invention is not limited to this. For example, the storage container may be a flexible plastic film container.

The container is stored in the storage container to be divided into the inside and the outside of the container. However, the invention is not limited to this. For example, a bowl-shaped container may be put over a part of the wall of the container to form a partial outside of the container. In such a case, only this part of the wall of the container covered with the bowl-shaped container is targeted for leakage inspection.

Furthermore, the ozone gas is generated in the atmosphere by the silent discharging. However, the invention is not limited to this. For example, a well-known ozone generation method such as silent discharging in oxygen or ultraviolet ray irradiation in the atmosphere may be used.

What is claimed is:

1. A method for inspecting leakage of a container, comprising:
    a differential pressure generation step of generating a differential pressure between the inside and the outside of the container;
    an ozone gas addition step of adding ozone gas to a higher pressure side of the inside and the outside of the container;
    an ozone concentration detection step of measuring an ozone concentration of a lower pressure side of the inside and the outside of the container; and
    a leakage determination step of determining presence of the leakage of the container based on a change in the ozone concentration, wherein
    the leakage determination step has an ozone concentration comparison step of calculating a concentration difference between the ozone concentration and a predetermined ozone concentration, and an ozone concentration determination step of determining presence of leakage when the concentration difference is larger than a predetermined value.

2. The method according to claim 1,
    wherein the differential pressure generation step has a container storage step of storing the container in a storage container, and a container pressurization/pressure reduction step of operating one of pressurization and pressure reduction for one of the container and the storage container.

3. The method according to claim 1,
    wherein the ozone gas addition step has an ozone gas generation step of generating ozone gas from the atmosphere, and an ozone gas feeding step of feeding the ozone gas to the higher pressure side of the inside and the outside.

4. The method according to claim 1,
    wherein the ozone concentration detection step has an ozone concentration measuring step of measuring an ozone concentration in a lower part of the inside or the outside by an ozone sensor, and an ozone concentration signal output step of outputting a signal corresponding to the measured ozone concentration.

5. The method according to claim 1,
    wherein the container is used as a container in which liquid is sealed.

6. An apparatus for inspecting leakage of a container, comprising:
    a storage container for storing the container therein in a sealed state;
    a pressurization/pressure reduction device communicating with one of the container and the storage container to operate one of pressurization and pressure reduction;
    an ozone gas feeder for feeding ozone gas to a higher internal pressure side of the container and the storage container;
    an ozone concentration detector for measuring an ozone concentration in a lower internal pressure side of the container and the storage container, wherein the ozone concentration detector outputs an ozone concentration signal corresponding to the ozone concentration measured; and
    a leakage determination device connected to receive the ozone concentration signal outputted by the ozone concentration detector,
    wherein the leakage determination device calculates a concentration difference between the ozone concentration measured and a predetermined ozone concentration and determines presence of leakage in the container when the ozone concentration exceeds a predetermined value.

7. A method for inspecting leakage of a container, comprising the steps of:
    generating a differential pressure between an inside and an outside of the container;
    adding ozone gas to a higher pressure side of the inside and the outside of the container;
    measuring an ozone concentration of a lower pressure side of the inside and the outside of the container; and
    determining presence of the leakage of the container based on a change in the ozone concentration, wherein determining leakage includes calculating a concentration difference between the ozone concentration measured and a predetermined ozone concentration, and determining presence of leakage when the concentration difference is larger than a predetermined value.

8. A method for inspecting leakage of a container, comprising:

a differential pressure generation step of generating a differential pressure between the inside and the outside of the container;

an ozone gas addition step of adding ozone gas to a higher pressure side of the inside and the outside of the container;

an ozone concentration detection step of measuring an ozone concentration of a lower pressure side of the inside and the outside of the container; and a leakage determination step of determining presence of the leakage of the container based on a change in the ozone concentration, wherein the leakage determination step has an ozone concentration comparison step of calculating a concentration difference between the ozone concentration and a predetermined ozone concentration, and an ozone concentration determination step of determining presence of leakage when the concentration difference is larger than a predetermined value, and further wherein the differential pressure generation step has a container storage step of storing the container in a storage container, and a container pressurization/pressure reduction step of operating one of pressurization and pressure reduction for one of the container and the storage container.

* * * * *